(No Model.) 2 Sheets—Sheet 1.
D. M. BALDWIN.
POTATO PLANTER.
No. 523,954. Patented July 31, 1894.
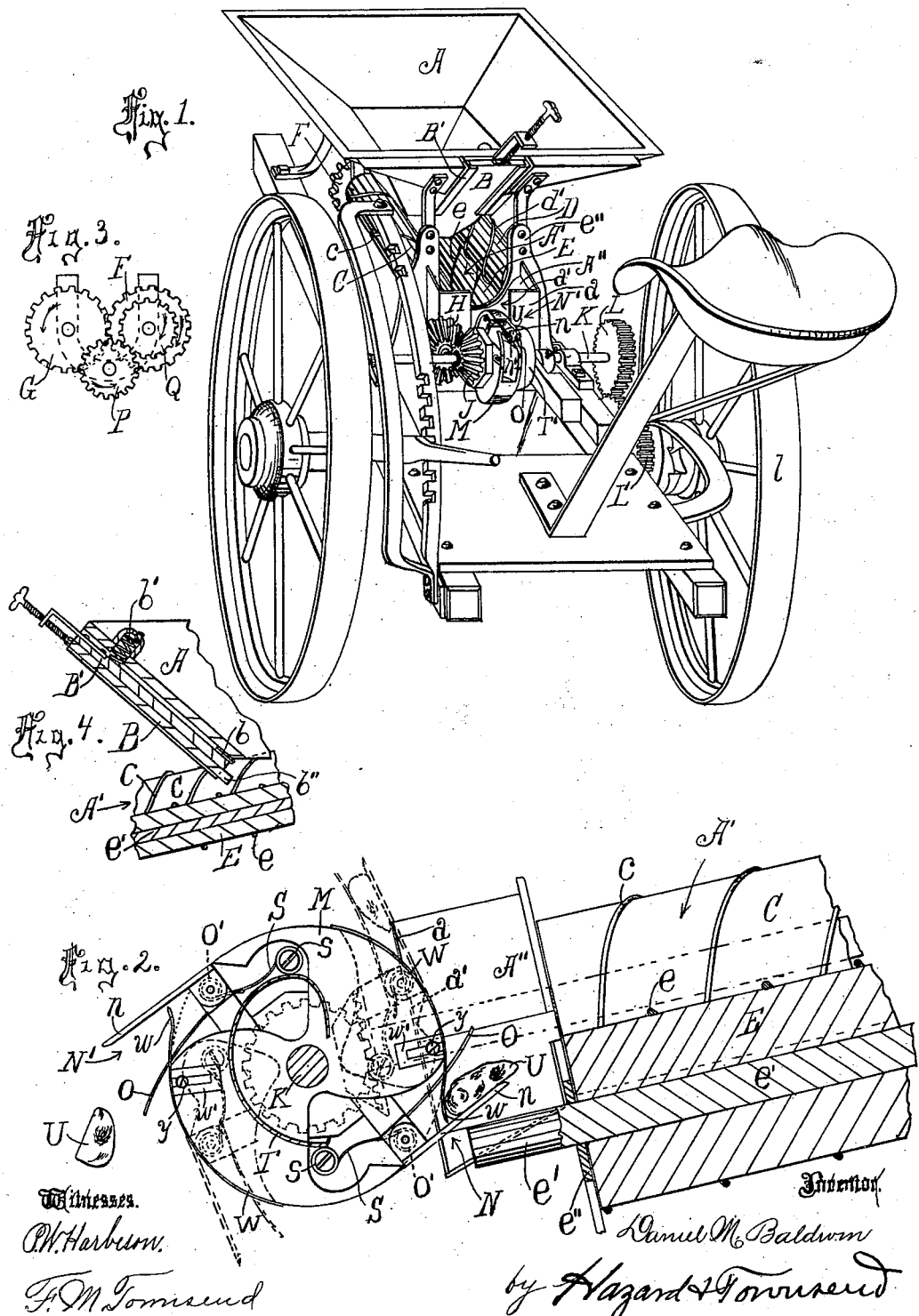
Witnesses.
O. W. Harberson.
F. M. Townsend.
Inventor.
Daniel M. Baldwin
by Hazard & Townsend
his Attys.

(No Model.) 2 Sheets—Sheet 2.
D. M. BALDWIN.
POTATO PLANTER.
No. 523,954. Patented July 31, 1894.
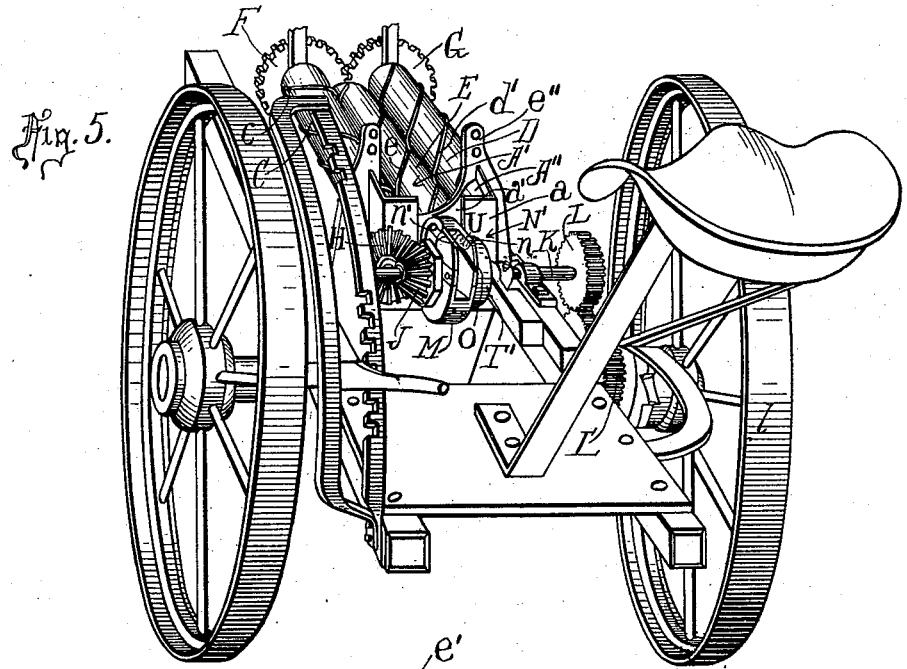
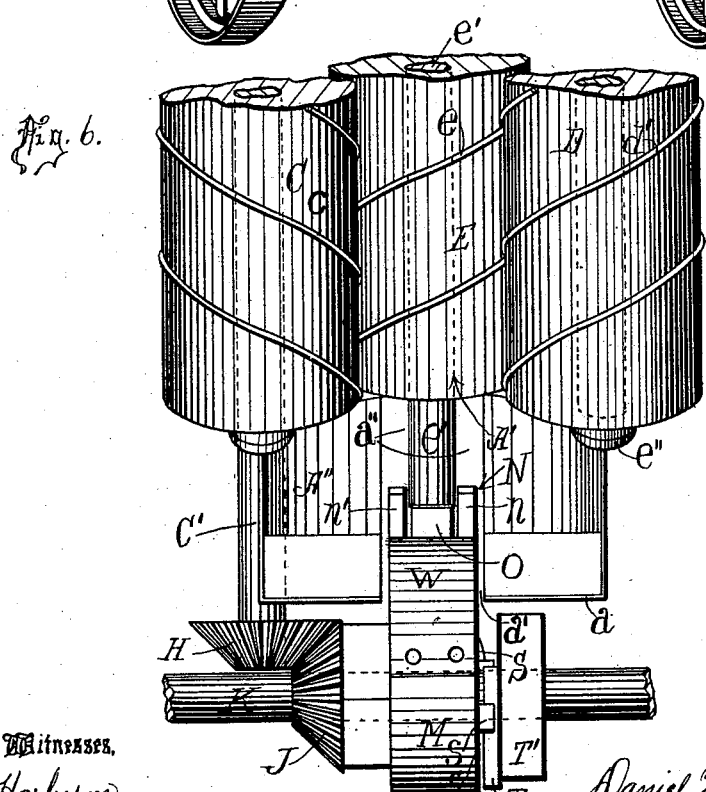
Witnesses．
P.W. Harbeson.
F. M. Townsend
Inventor.
Daniel M. Baldwin
by Hazard & Townsend
his Attys.
THE NORRIS PETERS CO., PHOTO-LITHO., WASHINGTON, D. C.

UNITED STATES PATENT OFFICE.

DANIEL M. BALDWIN, OF LOS ANGELES, ASSIGNOR OF ONE-HALF TO W. T. SNIDOW, OF SAN GABRIEL, CALIFORNIA.

POTATO-PLANTER.

SPECIFICATION forming part of Letters Patent No. 523,954, dated July 31, 1894.

Application filed June 9, 1893. Serial No. 477,071. (No model.)

*To all whom it may concern:*

Be it known that I, DANIEL M. BALDWIN, a citizen of the United States, residing at Los Angeles, in the county of Los Angeles and State of California, have invented a new and useful Potato-Planter, of which the following is a specification.

My invention relates to that class of planters which are used to drop seed potatoes or other tubers of irregular sizes which are liable to be easily broken or mashed, and which are liable to become clogged in the machine and thereby prevent regularity of feed.

My invention consists of the peculiar feed which I employ for conducting the tubers from the hopper to the dropper, and it also consists of means for receiving the tubers from the feeder and depositing them at regular intervals in the ground.

My invention comprises the combination of a series of spiral threaded rollers arranged to form a trough leading from the hopper to the dropper; means for rotating the rollers, and a yielding cut-off gate arranged to project into the trough to prevent the simultaneous passage of more than one tuber, and to allow tubers of different sizes to pass therebeneath.

My invention also comprises the combination in a potato planter, of two oppositely arranged fingers, one of such fingers being pivoted and provided with suitable means for normally forcing such finger toward the other finger to grasp a tuber therebetween, the two fingers being suitably supported and journaled to revolve about a common axis, and arranged to project forward in the direction of rotation and to pass upward through a suitable tuber retaining hopper; such tuber retaining hopper, arranged upon one side of the axis of such fingers, and adapted to allow the passage of such fingers upward therethrough and to prevent the escape of tubers downward therefrom; suitable means arranged to engage the yielding finger to spring such finger away from the other finger when the two fingers enter the hopper, and to release such finger to allow the fingers to grasp a tuber before the fingers leave the hopper; suitable means arranged to engage the yielding finger after the fingers leave the hopper, to spring such yielding finger away from the other finger to thereby release the tuber and allow it to be deposited in the ground, and suitable means for rotating the fingers.

My invention further comprises various combinations and arrangement of parts hereinafter fully set forth.

The accompanying drawings illustrate my invention.

Figure 1 is a perspective view of a potato planting machine embodying my invention. The gearing hidden by the hopper in this view is shown in Fig. 3. Fig. 2 is a fragmental sectional view of parts showing the arrangement of the tuber grasping and dropping fingers, and illustrating means for operating such fingers to grasp the tuber and to release the tuber from such fingers. Fig. 3 is a front elevation of the gearing for driving the rollers. Such gearing and rollers are shown in Fig. 1 and this view shows all of the gearing which is hidden by the hopper in Fig. 1. Fig. 4 is a fragmental longitudinal midsection of my improved cut-off gate. Fig. 5 is a perspective view of my improved machine with the hopper removed to expose the feed rollers. Fig. 6 is a fragmental plan view illustrating the arrangement of the tuber retaining hopper and the finger carrying drum. This view is a top view of that portion of the machine shown in Fig. 2 the rear of which is shown in Figs. 1 and 5.

In the drawings, A represents the supply hopper in which the seed potatoes are placed; this hopper opens into the head of the trough A' formed by the feed rollers.

B is an automatic feed gate arranged at the rear side of the hopper and projecting downward into the trough formed by the spiral threaded rollers C D and E, to prevent the passage of more than one tuber at a time.

F, G, are cog wheels arranged to mesh with each other, and are secured respectively to the rollers C D. The roller E which forms the bottom of the trough is provided with the cog wheel P, which meshes with the cog wheel Q which is fixed to the cog wheel F. By means of the gearing as thus arranged, it will be observed that the two upper rollers will be driven in reverse directions, while the lower roller at the same time will be driven the same direction corresponding with one of the drive rollers. The gearing is arranged as shown, so that when the machine is advanced, the side rollers will be rotated upward from the center of the trough, thus having a lifting effect upon the tuber, and freeing the lower roller from any clogging which might occur, and keeping the tubers well loosened up to insure proper feeding to the dropper.

The spiral threads $c\ d'$ upon the side rollers C D are reverse to each other, so that the rotation of such rollers as above described will cause both spirals to assist in bringing the feed downward toward the dropper. The spiral thread $e$ of the bottom roller E is wound in the same direction as the spiral thread $d'$, so that when the machine is driven to rotate the rollers in the directions indicated by the arrows in Fig. 3, the spiral thread $e$ (indicated in each of the views) will operate as a conveyer to carry the seed downward toward the dropper.

The means for driving the rollers consists of a cog wheel H, which is fixed to the shaft $C'$ of the roller C, and is arranged to mesh with the beveled cog wheel J, which is fixed to the driving shaft K, which is provided with the gearing wheel L, which meshes with the driving cog wheel $L'$ fixed to one of the supporting wheels $l$ of the machine.

The gaging or cut-off gate B, is arranged oblique to the rollers, and its lower end which, extends down into the trough formed by the rollers. As shown in Fig. 4, the bottom of this cut-off gate is straight and is not curved to conform to the roller E but I do not limit my claims to a cut-off gate having its bottom straight. This gate is mounted in a guide frame $B'$ which is hinged at its bottom to the under side of the sloping rear wall of the hopper by the hinges $b$. The upper end of this gate is operatively connected with the spring $b'$ which is arranged to normally force the upper end of the gate upward and forward, thus forcing the lower end of the gate backward and downward into the trough. The gate and its guide frame are practically one, the object of the guide frame being simply to allow the gate to be adjusted to enlarge or decrease the opening from the hopper.

In practice, the tubers are caught by the spiral threads of the rollers and are drawn under the lower point $b''$ of the gage B, which lower point $b''$ is thereby pressed upward and elevated, thus extending the spring $b'$, which as soon as the seed has passed beneath the point of the gate, draws the rear of the gate up against the rear wall of the hopper, thus forcing the front lower point $b''$ of the gate, which projects beyond the hinge $b$, down into its former position. After the tuber has passed the gate it is carried downward by the action of the feed rollers and is deposited in the tuber retaining hopper $A''$, which is arranged at the rear end of the trough, and is adapted to retain the tubers in proper position to be grasped by the tuber grasping finger, as will hereinafter be fully described.

M is the rotating tuber picking and finger carrying drum which is arranged upon the shaft K which is journaled to the frame of the machine.

N and $N'$ are two sets of tuber picking fingers which are fixed to such drum; each set of fingers consists of two tuber holding fingers $n\ n'$ arranged parallel with, but separate from each other, and tangential with the periphery of the drum, and a tuber grasping finger O pivoted to the drum and arranged intermediate the two tuber holding fingers and provided with a suitable spring $O'$, arranged and adapted to normally spring the tuber grasping finger outward toward the tuber holding fingers.

$A''$ is a suitable tuber retaining hopper which is arranged at the lower end of the feeder, to receive the tubers from the feed rollers, and is provided in its rear side wall $a$ with a drum receiving opening $a'$ adapted and arranged to allow the drum M to be rotated with a portion of its periphery projecting into the hopper, whereby, when the drum is rotated, it will carry the fingers upward through the hopper in one part of its revolution, and out of the hopper and downward exterior the hopper in the other part of its revolution.

By providing a drum upon which to mount the tuber carrying fingers, and by arranging such drum with a portion of its periphery projecting into the hopper through the drum receiving opening, I am enabled to introduce the fingers into the hopper and to pass them upward through the tubers without displacing any tubers excepting those in the path of the fingers, the circular drum revolving in contact with the tubers without appreciable friction; thus the power required to operate my improved picker is much less than that required to operate those picking devices in which the tuber picking fingers are mounted upon long arms which pass through the hopper and displace and bruise all the tubers in the path of the arm, in addition to those in the path of the fingers. This hopper is provided in its bottom with a finger slot $a''$, and a tuber supporting tongue $e'$ projects into such slot from the feed end of the hopper and toward the finger carrying drum. This tongue is arranged in the middle of the slot $a''$ and the tuber picking fingers $n\ n'$ enter the hopper one upon each side of such tongue when entering the hopper. As shown in the drawings, this tongue consists of the shaft $e'$ of the central roller E, which shaft projects downward beyond the yoke $e''$ in which it is journaled, and by its revolution keeps the tubers in motion and greatly assists the action of the fingers in picking the tubers from the hopper. These tuber picking fingers are arranged projecting toward the direction of rotation of the drum, and suitable means are arranged to spring the tuber grasping finger toward the drum as shown in Fig. 2, to allow the entrance of a tuber between the two tuber holding fingers and the grasping finger when the fingers are entering the hopper from the bottom. By springing the finger inward, it also is pressed close to the drum and so passes the end of the inwardly projecting tongue e′, which tongue prevents the tubers from falling out through the slot in the bottom of the tuber retaining hopper.

The means I have shown for operating the tuber grasping fingers comprises the operating lever S, which is fixed to the finger and projects out at one side of the drum, and is provided at its outer end with a bearing wheel s, which is arranged and adapted to engage with a finger operating cam shaped track T, which is fixed to the supporting block T′, which is arranged encircling the shaft K and is fixed to the frame of the machine. In Fig. 2, one set of fingers N, have just entered the tuber retaining hopper and a tuber U is in position upon the tuber holding fingers n n′, and the tuber grasping finger lever S is just about to be released from the cam T to allow the spring O′ to force the grasping finger out to grasp the tuber as indicated in dotted lines near the top of the drum. The other set of fingers are shown with the tuber discharging therefrom to be deposited in the ground.

A stop is arranged to prevent the tubers from sliding too far down upon the tuber holding fingers n n′, and consists of the plate W secured by one end to the drum M, and having its other end provided with two fingers w w arranged projecting toward and nearly touching the tuber holding fingers n n′, and provided with a slotted ear w′ projecting down along the side of the drum M and secured by means of a screw y. By loosening the screw, the finger may be moved outward and inward to gage the projection of the tuber holding fingers to suit the size of the tubers to be planted.

In practice, the tubers to be planted are placed in the supply hopper A and the machine is drawn forward; the rollers C, D, and E are rotated by means of the wheel l and the intermediate mechanism connecting such wheel with the rollers, and the tubers are carried beneath the gate B, one at a time, and are conveyed down the trough by the spiral threads upon the rollers, until they drop into the tuber retaining hopper A″. As the drum M is rotated by the rotation of the driving shaft K, the fingers N and N′ are carried upward alternately through the hopper, and the finger lever S, engaging with the cam T, operates the finger O to spring such finger in toward the periphery of the drum when the fingers are passing into the tuber retaining hopper to allow such finger to pass the tongue e′, and to allow a tuber to be picked up by the two tuber holding fingers. After the fingers have fully entered the hopper, the finger operating lever is released from its engagement with the cam T, and the spring O′ forces the finger outward to grasp the tuber as indicated in dotted lines in Fig. 2, and to carry the tuber out of the hopper. After the revolution of the drum has carried the fingers and the tuber fully away from the hopper into the position shown by the set of fingers N′ in Fig. 2, the finger operating lever engages with the cam T and presses the finger in toward the drum and releases the tuber to allow it to be deposited in the ground. The feeder carries the tubers down from the supply hopper to the tuber retaining hopper with sufficient regularity to insure there always being a tuber in the retaining hopper for the fingers to grasp and remove therefrom.

The operation of the dropper is perfectly regular and uniform, so that by the combination of the two devices, I provide a planter which is unfailing in operation, and will drop the tubers at exactly the same distance apart.

Now, having described my invention, what I claim as new, and desire to secure by Letters Patent, is—

1. The combination of the series of spiral threaded rollers arranged to form a trough leading from the hopper to the dropper; means for rotating the rollers, and a yielding cut-off gate arranged to project into the trough to prevent the simultaneous passage of more than one seed and to allow seeds of different sizes to pass.

2. The combination of the spiral threaded rollers arranged to form a trough; means for rotating such rollers; the hopper opening into the trough; the intermediate gate having one end projecting into the trough, and the spring operatively connected with the gate and arranged to force the lower end of the gate downward and backward into the trough.

3. The combination of the spiral threaded rollers arranged to form a trough; means for rotating such rollers; the hopper; the spring supported hinged guide frame, and the sliding gate arranged in the guide frame and having its lower end projecting into the trough.

4. In a potato planter, the combination of a rotating drum arranged with a portion of its periphery projecting through the side wall of a hopper and provided with two tangentially arranged holding fingers projecting from the drum, and also provided with a grasping finger projecting from the drum between the holding fingers and arranged to spring toward the holding fingers; such hopper provided with a finger slot, and with a central cylindrical tongue projecting into such slot; the grasping finger operating lever, fixed to the lever and arranged to engage a cam to spring the finger toward the drum when the fingers are entering the hopper; the cam arranged to operate the grasping finger, and means for rotating the drum.

5. The combination of the series of spirally threaded rollers arranged to form a trough leading from the hopper to the dropper; means for rotating the rollers; a yielding cut-off gate arranged to project into the trough; the hopper arranged at the end of such trough, and provided with a drum receiving opening and with the finger receiving slot; the tongue projecting into the slot; the drum having a portion of its periphery arranged in the opening in the hopper and journaled to revolve; the holding fingers fixed to such drum; the grasping finger pivoted to the drum and arranged intermediate the two holding fingers; the spring arranged to normally press such grasping finger toward the holding fingers; the operating lever fixed to the grasping finger and provided at its outer end with the roller adapted to engage a cam to spring such finger in toward the periphery of the drum during part of its revolution, and the cam.

6. In a potato planter provided with a rotating tuber picking device comprising two tuber holding fingers arranged parallel with but separate from each other to pass upward through a slot provided in the bottom of a tuber retaining hopper, a cylindrical tuber retaining tongue projecting into the slot from the feed end of the hopper and journaled to revolve and arranged to allow the tuber holding fingers to enter the hopper, respectively one upon each side of such tongue, and means for revolving the tongue.

7. A potato planting machine having a tuber retaining hopper provided with a drum receiving opening in one side, and having a tuber picking drum journaled to revolve and having a portion of its periphery projecting into the hopper through the opening therein, such drum being provided with suitable tuber picking devices adapted and arranged to grasp a tuber and remove it from the hopper when the drum is rotated, and suitable means for rotating the drum.

8. In a potato planter, the combination of two oppositely arranged fingers, one of such fingers being pivoted and provided with suitable means for normally forcing such finger toward the other finger to grasp a tuber therebetween, the two fingers being suitably supported and journaled to revolve about a common axis, and arranged to project forward in the direction of rotation and to pass upward through a suitable tuber retaining hopper; such tuber retaining hopper, arranged upon one side of the axis of such fingers, and adapted to allow the passage of such fingers upward therethrough and to prevent the escape of the tubers downward therefrom; suitable means arranged to engage the yielding finger to spring such finger away from the other finger when the two fingers enter the hopper, and to release such finger to allow the fingers to grasp the tuber before the fingers leave the hopper; suitable means arranged to engage the yielding finger after the fingers leave the hopper to spring such yielding finger away from the other finger to thereby release the tuber and allow it to be deposited in the ground, and suitable means for rotating the fingers.

9. In a potato planter having a rotating finger carrying drum provided with two tuber holding fingers projecting from such drum and arranged parallel with but separate from the other and tangential with the drum, and also provided with a tuber grasping finger pivoted to the drum and arranged intermediate the two tuber holding fingers and provided with a suitable spring arranged and adapted to normally spring such finger outward toward the tuber holding fingers, of a tuber stop, arranged to prevent the tubers from sliding too far down upon the tuber holding fingers, and attached to the drum by suitable means to allow such stop to be moved outward and inward to gage the projection of the tuber holding fingers to suit the size of the tubers to be planted.

DANIEL M. BALDWIN.

Witnesses:
ALFRED I. TOWNSEND,
F. M. TOWNSEND.